UNITED STATES PATENT OFFICE.

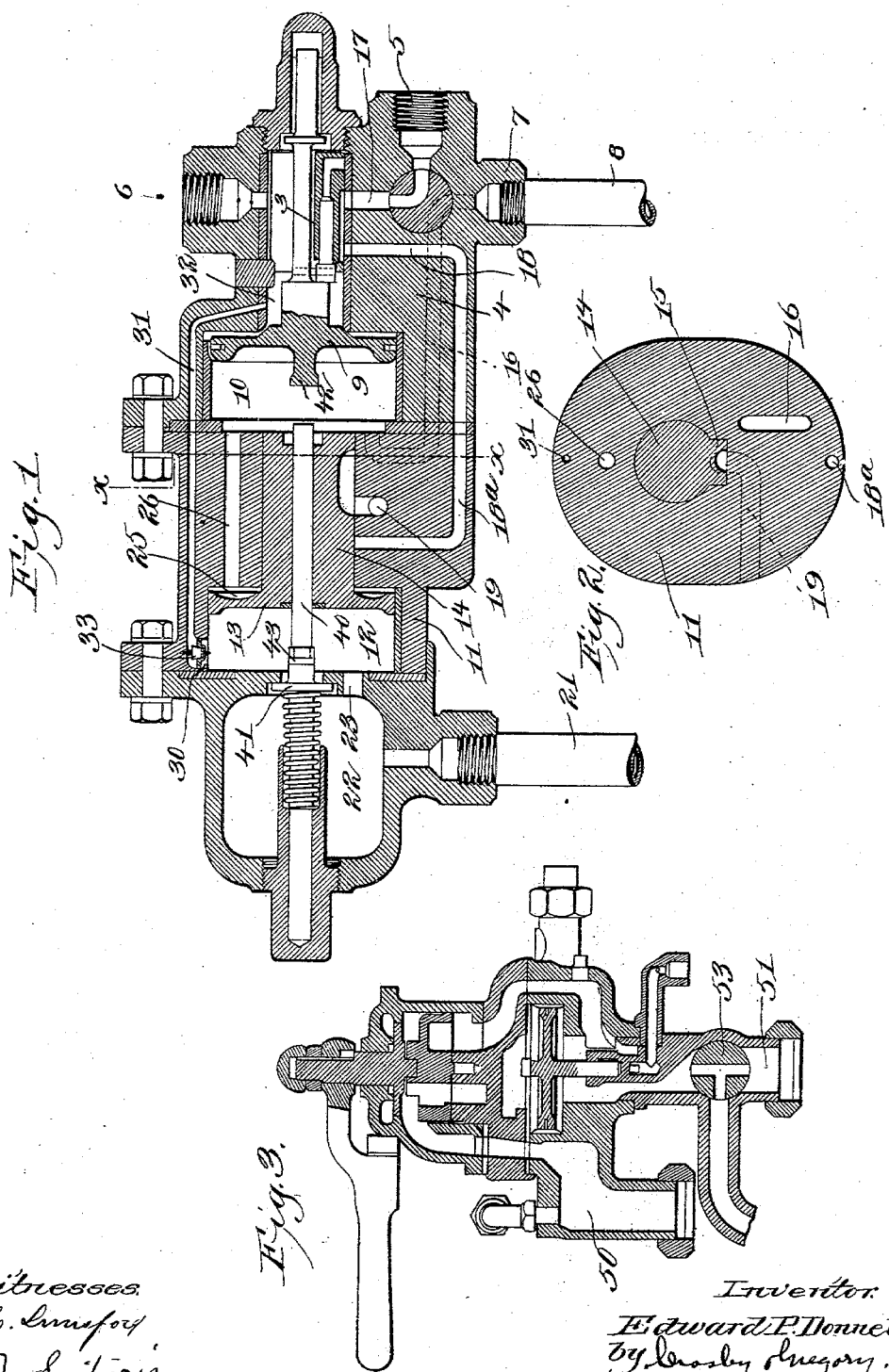

EDWARD P. DONNELLY, OF BOSTON, MASSACHUSETTS.

AIR-BRAKE APPARATUS.

SPECIFICATION forming part of Letters Patent No. 704,737, dated July 15, 1902.

Application filed March 5, 1902. Serial No. 96,766. (No model.)

*To all whom it may concern:*

Be it known that I, EDWARD P. DONNELLY, a citizen of the United States, and a resident of Boston, in the county of Suffolk and State of Massachusetts, have invented an Improvement in Air-Brake Apparatus, of which the following description, in connection with the accompanying drawings, is a specification, like numerals on the drawings representing like parts.

In one of the common forms of air-brake systems for trains a so-called "triple-valve" mechanism is employed which controls the supply of air from the auxiliary reservoir to the brake-cylinder and also the exhaust from the brake-cylinder.

When the triple-valve device is in its normal position, the exhaust-port of the brake-cylinder is open to the atmosphere and the auxiliary reservoir is in communication with the main reservoir, and when the air-pressure is reduced in the train-pipe the valve is operated to close the exhaust from the brake-cylinder, close the communication between the auxiliary reservoir and the main reservoir, and open communication between the auxiliary reservoir and brake-cylinder. With this form of apparatus as commonly constructed it is necessary in order to reëstablish communication between the auxiliary reservoir and main reservoir to bring the triple valve into such a position that the exhaust-port from the brake-cylinder is opened to the atmosphere, whereby the brakes are released. It is impossible, therefore, to pump up the auxiliary reservoir while the brakes are set, and this has been found to be a great disadvantage especially when it is necessary to make frequent applications of the brakes and to maintain the brakes set for a considerable length of time without releasing them, as when a train is descending a long down-grade, for under such circumstances the continuous application of the brakes with greater or less force for a long period of time without any release thereof gives no opportunity for placing the auxiliary reservoir in communication with the main reservoir for the purpose of maintaining a sufficient pressure in the auxiliary reservoir, and consequently the pressure in the latter reservoir is liable to fall so low as to fail to be effective in properly setting the brakes.

It is the object of my invention to so modify the triple-valve mechanism that the auxiliary reservoir may be pumped up while the brakes are set, thus providing means for always maintaining a sufficient pressure in the auxiliary reservoir regardless of whether the brakes are set for a shorter or longer length of time. To accomplish this I provide in addition to the regular triple-valve mechanism a supplemental valve which controls the exhaust from the brake-cylinder, which supplemental valve is independent from the triple valve and is under the control of the engineer.

With my apparatus after the brakes have been set and it is desired to pump up the auxiliary reservoir while they remain set the supplemental valve is operated to close the exhaust from the brake-cylinder, after which the triple valve may be restored to its normal position to bring the auxiliary reservoir into communication with the main reservoir without any danger of the air being exhausted from the brake-cylinder.

In the preferred form of my invention I employ in addition to the main train-pipe, the pressure in which controls the triple valve, an auxiliary train-pipe, the pressure in which is under the control of the engineer and which controls the operation of the supplemental valve.

In the drawings, Figure 1 is a central sectional view of a triple-valve mechanism with my improvements added thereto. Fig. 2 is a section on the line *x x*, Fig. 1; and Fig. 3 is a view of an engineer's valve, showing how the pressure in the auxiliary train-pipe may be controlled.

My invention is adapted to be employed in connection with the ordinary triple valve, and in the drawings the casing which incloses the usual triple valve 3 is designated by 4, said casing having a nipple 5 to connect with a pipe leading to the brake-cylinder, a communication 6 to connect with the auxiliary reservoir, and a nipple 7 connecting with the main train-pipe 8, all as usual in triple valves.

The usual piston forming part of the triple-valve mechanism is designated by 9, and this operates in the chamber 10, as common in this art.

Secured to the casing 4 is a supplemental casing 11, having a chamber 12 therein of the same size as chamber 10, in which chamber operates a piston 13, constituting a movable partition and having a suitable stem 14, provided with a valve 15.

The casing 11 is provided with an aperture of a size to tightly fit the stem 14, and the lower side of the aperture is recessed and provided with a flat face to receive the flat face of the valve 15, as shown in Fig. 2.

The main train-pipe 8 connects with a port 16, (shown in dotted lines, Fig. 1,) which leads into the chamber 10, as usual. The port 18, which in the ordinary form of triple valves leads directly to the atmosphere, is in my invention continued through the casings 4 and 11, as shown at 18$^a$, and is controlled by the valve 15. An exhaust-port 19 leads through the casing 11 directly to the air. From this it will be seen that in order to exhaust the air from the brake-cylinder to release the brakes the triple valve has not only to be in a position to place the ports 18 and 17 in communication, but the supplemental valve 15 must also be in position to bring the ports 19 and 18$^a$ into communication.

As I have stated, the supplemental valve 15 is capable of operation independently of the triple valve and is under the control of the engineer, and for this purpose I have provided an auxiliary train-pipe 21, which is independent from the main train-pipe and extends the length of the train and which opens into a chamber 22, having communication by a port or ports 23 with the chamber 12.

The chamber 12 at the left of the movable partition or piston 13 is thus in communication with the auxiliary train-pipe, and the chamber at the right of said movable partition has communication with the main train-pipe, the result of this being that the pressure on the two sides of the movable partition is the same as in the auxiliary and main train-pipes, respectively. To thus put the right-hand end of the chamber 12 into communication with the main train-pipe the right-hand side of the piston or movable partition 13 may be provided with an annular recess 25 and one or more passages or ports 26 may be extended through the casing 11 to establish communication between the groove 25 and the chamber 10, and thus with the main train-pipe. It will now be observed that assuming the parts to be in the position shown in Fig. 1 if the pressure in the main train-pipe 8 is decreased the piston 9 will move to the left and will admit compressed air to the brake-cylinder to set the brakes as usual, the decreased pressure in the chamber 10 holding the piston 13, and consequently the valve 15, in the position shown in Fig. 1.

To pump up the auxiliary reservoir while the brakes still remain set, it is simply necessary to connect the train-pipe 8 with the main reservoir through the ordinary engineer's valve, when the increased pressure in the train-pipe will force the piston 9 into the full-line position, and thus connect the auxiliary reservoir with the main reservoir. Without my improvements the brake-cylinder would in this position of the triple valve be connected with the exhaust-port; but since the pressure in the auxiliary train-pipe 21 is equal to that in the main train-pipe the increased pressure in the main pipe does not affect the position of the auxiliary valve, which, it will be observed, closes the exhaust-port 18$^a$ and holds the air-pressure in the brake-cylinder. To release the brakes, it is merely necessary to reduce the pressure in the auxiliary train-pipe, when the piston 13 will move to the left and bring the ports 19 and 18$^a$ into communication. It is possible also to set the brakes by reducing the pressure in the first instance in the auxiliary train-pipe instead of in the main train-pipe, for if this is done the piston 13 will first be moved to the left until it is alined with the leak-groove or by-pass 30, when the chambers 12 and 10 will be brought into communication and the air-pressure reduced in the chamber 10, thus moving piston 9 of the triple valve, thus closing the exhaust from the brake-cylinder, and establishing communication between the auxiliary reservoir and brake-cylinder. I prefer, however, to set the brake by means of the train-pipe 8 only. I may, if desired, also provide a by-pass or passage-way 31, which extends from the chamber 12 through the casings 11 and 4 and into the chamber 32 to the right of the piston 9, said passage-way having situated therein a suitable check-valve 33, which admits air from the chamber 12 to the chamber 32, but prevents the return of the air.

When the by-pass 31 is employed, it is not necessary to make as great a reduction of pressure in the chamber 10 to apply the brakes as where said by-pass is omitted, for if a reduction, say of five pounds, is made in the chamber 10 and the piston 9 is moved to the left the air-pressure in the chamber 12 will lift the check-valve and admit air from the auxiliary train-pipe through the by-pass 31 into the brake-cylinder, so that in setting the brakes the benefit of the air-pressure in the auxiliary train-pipe is obtained, as well as of the pressure in the auxiliary reservoir. The consequence is that less air is used from the reservoir than if all the air admitted to the brake-cylinder had come from the auxiliary reservoir. This operation will not in any way alter the position of the piston 13, for the pressure in the chamber 10 will always be slightly less than that in the chamber 12, and since the piston 13 maintains the position shown the exhaust-port from the brake-cylinder is maintained closed.

If now it is desired to pump up the auxiliary reservoir while the brakes remain set, it is simply necessary to connect the main train-pipe with the pumping mechanism or the main reservoir through the engineer's valve, when the pressure in the chamber 10 will be restored to normal, the piston 9 will be moved into the position shown in Fig. 1, and the increased pressure will be admitted through the usual by-pass around said piston to the auxiliary reservoir. I may, if desired, connect both the main and auxiliary train-pipes to the main reservoir at the same time, when the auxiliary reservoir will be supplied through both the chambers 10 and 12.

Extending through the stem 14 and piston 13 is a plunger 40, the left-hand end of which is adapted to engage the usual spring-pressed stop 41, while the right-hand end is in position to be engaged by the usual stem 42 on the piston 9. The plunger is constructed to slide freely through the piston 13 and preferably will be packed to prevent leakage of air past the same. The plunger constitutes, in effect, an extension of the yielding stop 41 and is of such a length that when a service application of the brakes is made the said plunger by its engagement with the stop serves to properly limit the movement of the piston 9. When an emergency application of the brakes is made, however, the plunger and stop yield sufficiently to allow the piston 9 to make a full stroke.

I will preferably provide a suitable head or shoulder 43 on the plunger 40, which shoulder is engaged by the piston 13 when the application of the brakes is accomplished through the auxiliary train-pipe 21, whereby the yielding stop serves to limit the movement of the said piston or to allow it to have a full stroke, according as to whether a service or emergency application of the brakes is made.

Any suitable means may be employed for controlling the air-pressure in the auxiliary train-pipe from the engineer's cab; but in Fig. 3 I have illustrated how the ordinary engineer's valve may be adapted to this purpose. In said figure, 50 designates the nipple connecting with the main reservoir, and 51 that connecting with the main train-pipe 8.

I may connect the auxiliary train-pipe 21 to the main train-pipe by means of a valved connection, which may be opened or closed, so that when the valve connection is open the pressure in the two train-pipes will be equalized, while when it is closed they may be varied independently.

In Fig. 3, 52 is the nipple which connects with the auxiliary train-pipe 21, and this has the ordinary three-way valve 53 therein. When this valve is open, the two train-pipes are in communication with each other. When it is closed, however, the pressure in the two train-pipes may be varied independently, and by employing a three-way valve the pressure in the auxiliary train-pipe may be released without affecting that in the main train-pipe. It will be understood, however, that various other ways of controlling the pressure in the auxiliary train-pipe may be employed without departing from my invention. I also desire to state that my invention is not limited in all of its details to the structure shown herein, for since I believe that I am the first to employ in addition to the usual triple valve a chamber having a movable partition to which is connected a supplemental valve for controlling the exhaust from the brake-cylinder and connecting the chamber on one side of the movable partition with the main train-pipe and providing means for controlling the pressure on the other side of said partition independently of train-pipe pressure I desire to claim the same broadly, and I consider as coming within my invention any mechanism having these features regardless of the particular construction of the chamber or of the manner of connecting the same with the auxiliary train-pipe.

Having described my invention, what I claim as new, and desire to secure by Letters Patent, is—

1. In an air-brake apparatus, the combination with the usual triple valve, auxiliary reservoir, brake-cylinder, and main train-pipe, of a chamber having a movable partition therein, the chamber on one side of said partition having communication with the main train-pipe, means to vary the pressure on the other side of said partition independently of the train-pipe pressure, and a supplemental valve operated by the movements of the partition, said valve controlling the exhaust from the brake-cylinder.

2. The combination, with the usual triple valve, of a chamber having a movable partition therein, the chamber on one side of said partition having communication with the main train-pipe, means under the control of the engineer to vary the air-pressure on the other side of said partition independently of the train-pipe pressure, and a supplemental valve connected to and operated by the movements of the partition, said valve controlling the exhaust from the brake-cylinder.

3. A triple valve controlling communication between the auxiliary reservoir and brake-cylinder, a chamber having a piston therein, a supplemental valve operated by said piston and controlling the exhaust from the brake-cylinder, one side of said piston being subjected to the pressure in the train-pipe, and means to vary the pressure on the other side of said piston independently of the train-pipe pressure, whereby the supplemental valve may be operated independently of the triple valve.

4. A triple valve controlling communication between the auxiliary reservoir and brake-cylinder, a chamber having a piston therein, a supplemental valve operated by said piston and controlling the exhaust from the brake-cylinder, one side of said piston being subjected to the pressure in the train-pipe, and means under the control of the engineer to vary the air-pressure on the other side of said piston independently of the train-pipe pressure, whereby the supplemental valve may be operated independently of the triple valve.

5. In an air-brake apparatus, main and auxiliary train-pipes, a triple valve controlling the supply of air to the brake-cylinder and adapted to be operated by variations of pressure in the main train-pipe, a chamber having a movable partition therein, a chamber on one side of the partition being connected to the main train-pipe, and on the other side to the auxiliary train-pipe, a supplemental valve operated by movements of the partition, said valve controlling the exhaust from the brake-cylinder, and means to vary independently the pressure in the main and auxiliary train-pipes.

6. In an air-brake apparatus, main and auxiliary train-pipes, a triple valve, a chamber having a leak-groove in its side, a piston in said chamber, a supplemental valve controlling the exhaust from the brake-cylinder, said valve being connected to and operated by the piston, the chamber on one side of the piston having communication with the main train-pipe, and on the other side with the auxiliary train-pipe.

7. In an air-brake apparatus, main and auxiliary train-pipes, a triple valve controlled by the pressure in the main train-pipe, and a supplemental valve controlling the exhaust from the brake-cylinder, said supplemental valve being controlled by the difference in the pressure in the main and auxiliary train-pipes.

8. In an air-brake apparatus, main and auxiliary train-pipes, a triple valve controlled by the pressure in the main train-pipe, a chamber connected with both the main and auxiliary train-pipes, a piston in said chamber, a supplemental valve controlling the exhaust from the brake-cylinder and operated by said piston, and means for varying the air-pressure in the main and auxiliary train-pipes independently.

9. In an air-brake apparatus, main and auxiliary train-pipes, a triple valve controlled by the pressure in the main train-pipe, a chamber having communication with both the auxiliary and main train-pipes, a piston in said chamber, a supplemental valve controlling the exhaust from the brake-cylinder and operated by said piston, means for varying the air-pressure in the main and auxiliary train-pipes independently, and a by-pass connecting the said chamber with the brake-cylinder.

10. In an air-brake apparatus, a triple valve including a piston operating in a chamber, a supplemental chamber connected to said first-named chamber, a supplemental piston operating in said supplemental chamber, means operated by the supplemental piston to control the exhaust from the brake-cylinder, and means for controlling the air-pressure on the two sides of the supplemental piston independently.

11. In an air-brake apparatus, a triple valve including a piston operating in a chamber, a supplemental chamber having communication with the first-named chamber, a supplemental piston operating in said supplemental chamber, an exhaust-valve from the brake-cylinder controlled by the supplemental piston, a pin freely slidable through the latter, and a spring-stop adapted to be engaged by the pin, the construction being such that when the triple valve is operated its movement is controlled by the spring-stop through the said pin.

In testimony whereof I have signed my name to this specification in the presence of two subscribing witnesses.

EDWARD P. DONNELLY.

Witnesses:
LOUIS C. SMITH,
JOHN C. EDWARDS.